United States Patent [19]

Green

[11] Patent Number: 4,956,888
[45] Date of Patent: Sep. 18, 1990

[54] FORMATION OF FASTENERS AND CONNECTIONS WITH VARIABLE PITCH THREADS

[76] Inventor: William P. Green, 3570 E. Lombardy Rd., Pasadena, Calif. 91107

[21] Appl. No.: 318,859

[22] Filed: Mar. 6, 1989

Related U.S. Application Data

[62] Division of Ser. No. 738,256, May 28, 1985, Pat. No. 4,842,464.

[51] Int. Cl.⁵ .................... B21D 53/20; F16B 39/30
[52] U.S. Cl. .................................. 10/86 A; 10/86 R
[58] Field of Search ............................ 10/86 R, 86 A; 411/288-291, 263, 307, 432, 433, 438, 929.1, 937.1

[56] References Cited

U.S. PATENT DOCUMENTS

| | | |
|---|---|---|
| 197,467 | 11/1877 | Harvey .................... 411/307 |
| 627,206 | 6/1989 | Richardson . |
| 770,945 | 9/1904 | Tuller . |
| 1,123,505 | 1/1915 | Eilers . |
| 1,174,247 | 3/1916 | Flint . |
| 2,328,706 | 9/1943 | Brackett . |
| 2,402,159 | 6/1946 | Hattan . |
| 2,407,879 | 9/1946 | Haas ..................... 411/438 |
| 2,439,687 | 9/1948 | Findley ................. 411/438 |
| 2,464,808 | 3/1949 | Hattan . |
| 2,497,081 | 2/1950 | Hattan . |
| 2,515,220 | 7/1950 | Hattan . |
| 2,794,475 | 6/1957 | Pachmayr . |
| 2,870,668 | 1/1959 | Flahant . |
| 2,888,853 | 6/1959 | Pachmayr . |
| 3,039,507 | 6/1962 | Hattan . |
| 3,272,250 | 9/1966 | Hattan . |
| 3,283,350 | 11/1966 | Hattan . |
| 3,385,339 | 5/1968 | Dahl . |
| 3,806,265 | 4/1974 | Hattan . |
| 3,938,209 | 2/1976 | Hattan . |
| 3,943,587 | 3/1976 | Lashy ................... 411/438 |
| 4,012,828 | 3/1977 | Dahl . |
| 4,040,462 | 8/1977 | Hattan . |
| 4,266,590 | 5/1981 | McKewan ............. 411/307 |
| 4,364,136 | 12/1982 | Hattan . |
| 4,545,104 | 10/1985 | Hattan . |

FOREIGN PATENT DOCUMENTS

| | | |
|---|---|---|
| 158878 | 11/1921 | United Kingdom . |
| 523403 | 7/1940 | United Kingdom . |
| 524157 | 7/1940 | United Kingdom . |
| 569581 | 5/1945 | United Kingdom ........ 411/307 |
| 610355 | 10/1945 | United Kingdom . |
| 629643 | 9/1949 | United Kingdom . |
| 826469 | 1/1960 | United Kingdom . |
| 839216 | 6/1960 | United Kingdom . |

Primary Examiner—Timothy V. Eley

[57] ABSTRACT

A method of forming a composite nut having a threaded connection in which the axial load between a screw and nut in a tightened condition of the connection is distributed more uniformly between different turns of the engaged threads than in a standard threaded connection by forming the nut to have a pitch which increases progressively as the thread advances helically in a predetermined axial direction, while the other thread desirably has a pitch which is uniform along its length. The pitch of the first thread may increase at a rate predetermined to compensate for differences in the tensile force which is applied to the screw and the compressive force applied to the nut at different points along their length when the screw and nut are tightened together to a prestressed condition.

5 Claims, 5 Drawing Sheets

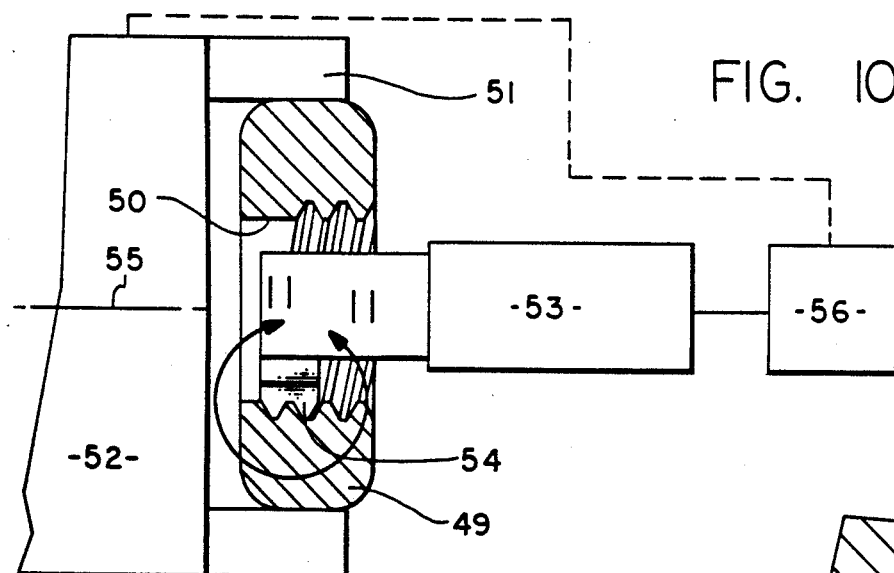
FIG. 10
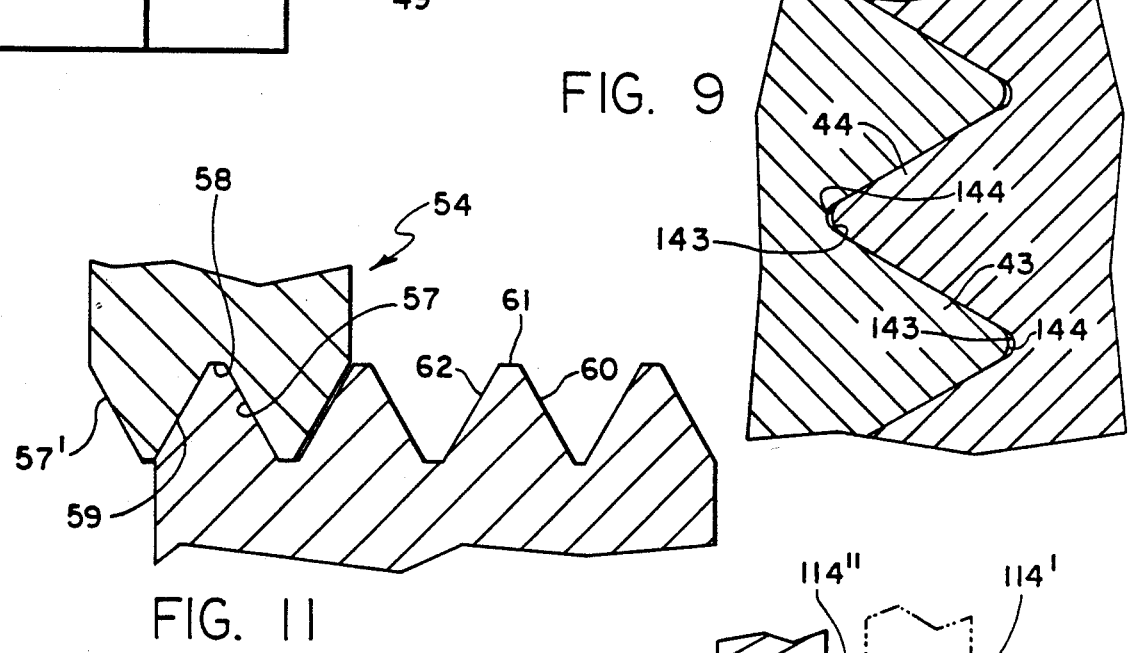
FIG. 9
FIG. 11
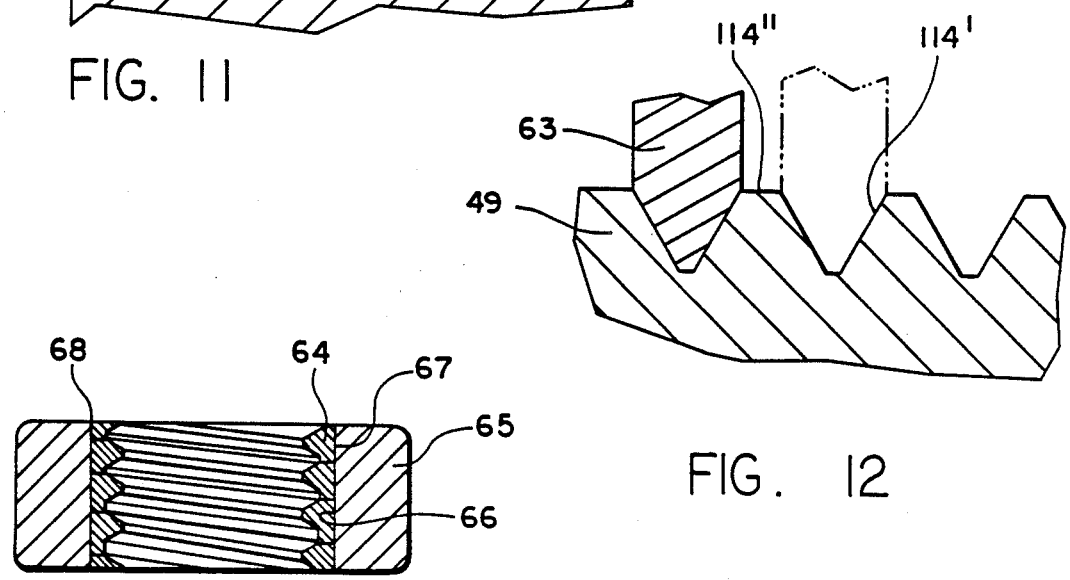
FIG. 12
FIG. 13

FORMATION OF FASTENERS AND CONNECTIONS WITH VARIABLE PITCH THREADS

BACKGROUND OF THE INVENTION

This application is a division of copending application Ser. No. 6/738,256 filed May 28, 1985 now U.S. Pat. No. 4842464.

This invention relates to improved threaded connections which are especially designed to divide the total axial load forces of a made-up connection as uniformly as possible among the various different turns of the engaged threads.

In a standard threaded connection between an externally threaded screw and an internally threaded nut, there is an inherent tendency when the screw and nut are tightened against a workpiece for the axial load forces between the screw and nut to be transmitted primarily through the thread turns which are located near the axially inner end of the nut, that is, the end adjacent the work. The last turn of the nut at that end takes much more than its fair share of the load, the next successive turn in a direction away from the work takes a smaller amount but still more than the third turn, with this condition continuing to the axially outer end turn which may take very little load. In a highly prestressed connection in which the screw and nut are intentionally tightened to a very high torque maintaining the screw permanently under a heavy tensional force, the non-uniform distribution of load forces between different turns of the engaged threads is exaggerated drastically, and may lead to early failure of the connection at the location of the overloaded axially inner turns.

An arrangement for transferring more of the load in a threaded connection toward the axially outer end of the nut has been disclosed in U.S. Pat. Application Ser. No. 380,439 filed May 20, 1982 by Mark Hattan on "Method Of Forming A Fatigue Resistant Threaded Connection", and in U.S. Pat. No. 4,364,136 issued Dec. 21, 1982 to Mark Hattan on "Formation Of Threaded Elements Having A Self-Locking Action". Those prior disclosures show a type of fatigue resistant nut which may consist of two separately formed nut bodies welded or otherwise secured rigidly together and having two similar internal threads aligned axially with one another but turned about their common axis relative to one another so that neither thread is a true helical continuation of the other The two threads of the nut then engage a standard thread of a coacting screw in a relation giving the connection an interfering self locking action, and also causing axial load forces upon tightening of the nut against a workpiece to initially be taken primarily by the axially outer one of the nut bodies and then be gradually transferred in part to the axially inner nut body as the torque is progressively increased.

SUMMARY OF THE INVENTION

The major purpose of the present invention is to provide a threaded connection in which the axial load forces are distributed more uniformly than in prior arrangements between all of the different individual turns of the engaged threads of the two interconnected parts. This more uniform and preferably precisely equal distribution of the load forces between the different thread turns can be attained even in an extremely highly stressed condition of the connection, in a manner avoiding any tendency for early failure of an axially inner turn or turns of the nut and thereby increasing the extent to which the connection can be prestressed in use. In order to achieve these results, the nut is formed to have a thread which is slightly different than the thread of the screw, and which in particular has a non-uniform pitch increasing progressively and gradually as the thread advances helically and axially along the length of the nut The coacting thread of the screw may be of uniform pitch along its entire length As the two parts are tightened together against a workpiece, the screw is stretched axially to a slight extent by the load forces, and the nut may be compressed slightly by those forces, in a manner ultimately distributing the load between the different turns of the dissimilar threads more uniformly than in a conventional threaded connection.

The thread of the nut may have a minimum effective pitch at its axially outer end corresponding essentially to the pitch of the coacting external thread of the screw, with the pitch of the nut thread increasing progressively and desirably uniformly from that axially outer end to a maximum pitch condition at the axially inner end of the nut adjacent the work. The variation in pitch along the length of the nut is desirable in order to compensate for the fact that the tensional force applied to the screw in the tightened condition of the nut is not uniform along the length of the screw, and in particular is greater near its axially inner end than at its axially outer end. Similarly, the compressive force to which the nut is subjected is not uniform along the length of the nut, and is greater toward the axially inner end of the nut adjacent the work than at its axially outer end. As a result, the screw stretches and the nut compresses to a greater extent near the axially inner end of the nut than at its axially outer end, and the amount of elongation of the screw and compression of the nut decrease progressively between the inner end of the nut and its outer end The variation in pitch of the nut thread compensates for this non-uniform axial distortion of the parts and may cause the different turns to engage with essentially equal force when a particular predetermined fully stressed condition is attained.

BRIEF DESCRIPTION OF THE DRAWINGS

The above and other features and objects of the invention will be better understood from the following detailed description of the typical embodiments illustrated in the accompanying drawings in which:

FIG. 9 is a section through another form of the invention;

FIG. 10 illustrates diagrammatically a method and apparatus for producing the nut of FIGS. 1 to 5;

FIG. 11 is an enlarged fragmentary section through the nut and threading tool of FIG. 10;

FIG. 12 is a view similar to FIG. 11 but showing a cutting tool for forming the nut of FIG. 6;

FIGS. 13, 14 and 15 are axial sectional views of three additional variational nuts embodying the invention;

DESCRIPTION OF THE PREFERRED EMBODIMENTS

Figure 1:
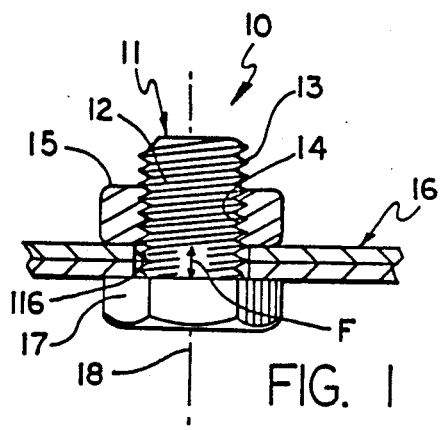
FIG. 1 shows a threaded connection embodying the present invention.
Figure 2:
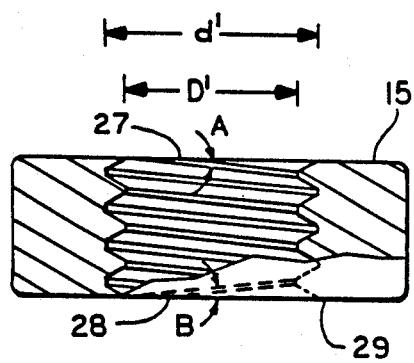
FIG. 2 is an enlarged fragmentary axial section through the nut and screw of FIG. 1 and showing them detached from one another.
Figure 2:
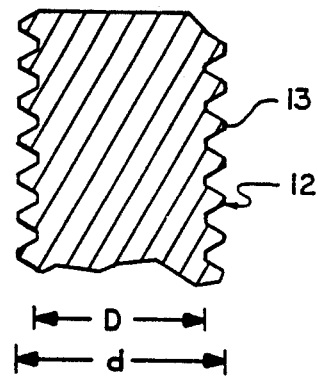

The threaded connection 10 illustrated in FIG. 1 includes a screw 11 having a shank 12 with an external thread 13 engaging an internal thread 14 of a nut 15 tightenable downwardly on the shank to clamp two workpieces 16 (typically in the form of flat metal plates) axially between the nut and an enlarged head 17 of the screw. If the threaded parts are tightened together to a highly stressed condition in which a high tensional force F is applied to the shank of the screw at a location within openings 116 of the workpieces 16, that prestressed condition of the connection has a tendency to reduce deterioration of the parts from fatigue effects when the connection is subjected to vibrational forces in use.

Figure 3:
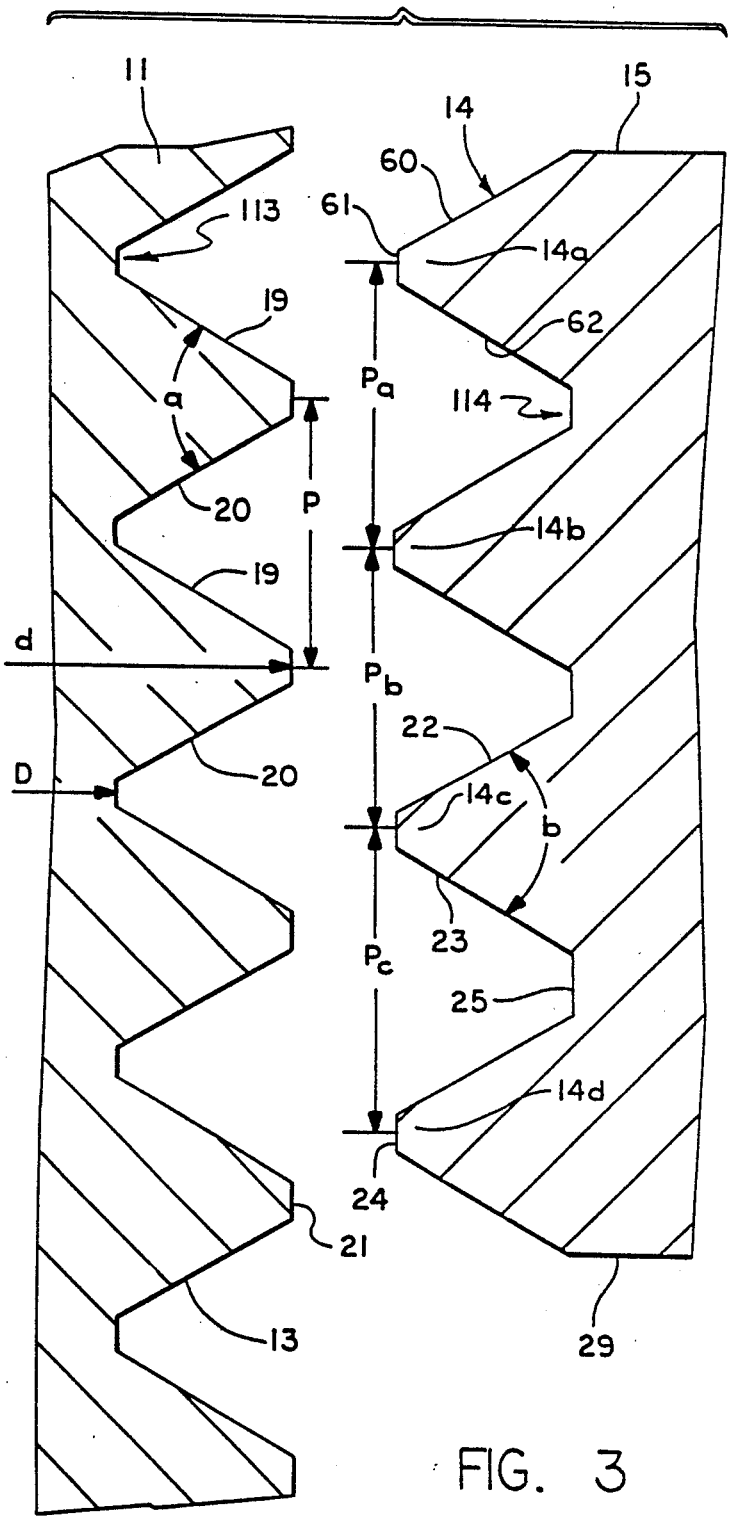
FIG. 3 is a further enlarged axial section through the threads of the screw and nut as they appear when detached from one another, but with the thread of the nut being illustrated horizontally opposite the thread of the screw to show at least diagrammatically the relationship beteween the configuration of the screw and nut threads.

The external thread 13 of the screw is illustrated fragmentarily in axial section in the left hand portion of FIG. 3, and may be a completely standard thread centered about axis 18 of the connection and having a uniform minor diameter D and a uniform major diameter d along the entire length of the thread. The axial sectional profile of each turn of thread 13 may be that of a standard 60 degree thread, having a 60 degree angle a between the opposite side faces 19 and 20 of each turn, and having a crest surface 21 and root surface 121 both typically extending cylindrically about axis 18 (or rounded if desired). This profile is identical for all of the different turns of thread 13 of the screw, except as that profile may be chamfered at the outer end of the thread.

Figure 4:
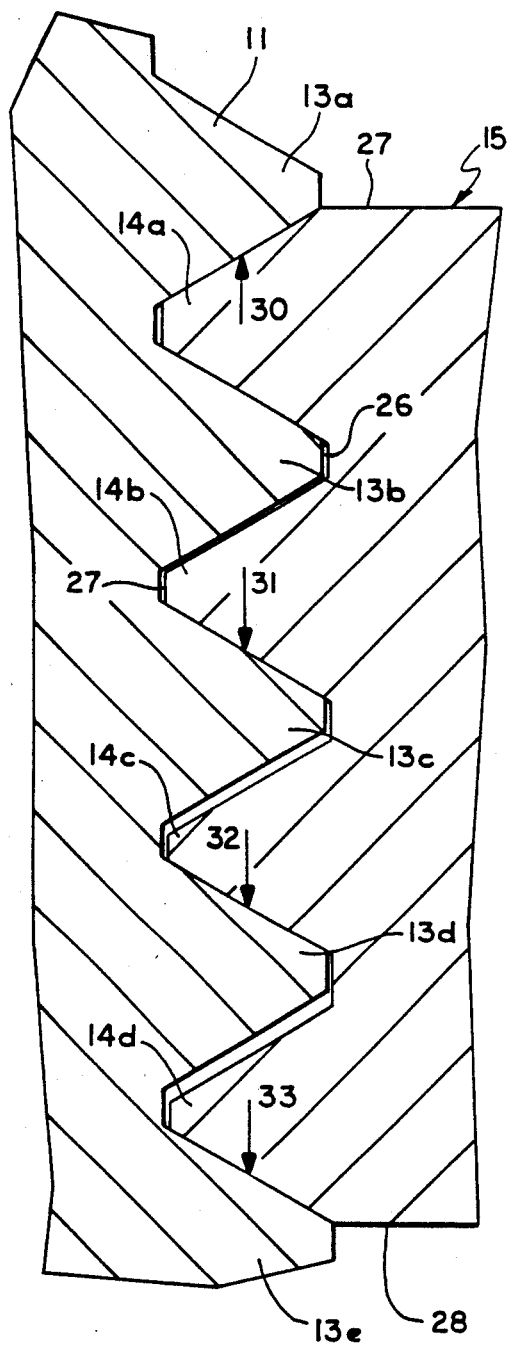
FIG. 4 shows the screw and nut threads in contact with one another but before engagement of the nut with the work.

The internal thread 14 of nut 15 may of course have any desired number of turns, but is typically illustrated as having only four turns 14a, 14b, 14c and 14d in order to allow the individual turns to be shown on a relatively large scale. The axial sectional profile of thread 14 in the FIGS. 1 to 5 form of the invention is preferably uniform along the entire helical extent of that thread, except to the extent that the nut thread may if desired be chamfered at opposite ends in conventional manner. To avoid complexity in the drawings of the present application, no attempt has been made to illustrate such chamfering of the thread of either the screw or nut. Thus, as viewed in FIG. 3, the axial sectional profile of each of the individual turns 14a, 14b, etc. of the nut thread is identical to the profile of each of the other turns, and in particular is defined by two opposite side faces 22 and 23 of the thread disposed at a 60 degree angle b with respect to one another corresponding to the angle a of the thread of the screw, and with crest and root surfaces 24 and 25 of the nut thread extending cylindrically about axis 18 of the connection (or being rounded if desired) The minor diameter D' of the internal thread of the nut (the diameter of crest surfaces 24) may be slightly greater than the minor diameter D of thread 13 of the screw in order to allow slight spacing of the threads at 27 (FIG. 4). Similarly, the major diameter d' of the internal thread of the nut (at the location of root surfaces 25 of the nut thread) may be slightly greater than the major diameter d of the external thread of the screw, to provide a slight spacing of the parts at 26.

The pitch P of external thread 13 of screw 11, that is, the axial distance between corresponding portions of successive turns of thread 13, is uniform along the entire length of the thread. The pitch of the internal thread 14 of the nut, on the other hand, is not uniform, but increases slightly and progressively as the thread advances downwardly from the upper extremity of the nut to its lower extremity. Similarly, the lead angle or helix angle of the nut thread, which of course is related to the pitch, increases slightly and progressively from a minimum lead angle at the upper end of the thread (represented somewhat diagrammatically at A in FIG. 2) to a maximum lead angle at the lower end of the thread (represented at B in FIG. 2). In the FIG. 3 form of the invention, the increase in pitch and lead angle is attained by slightly and progressively increasing the axial width of groove 114 and of root surface 25 between successive turns of the nut thread as that thread advances downwardly. The axial width of the groove 113 between successive turns of the thread of the screw preferably remains the same at all locations, since the pitch of the screw thread is preferably uniform.

In FIG. 3, the pitch distances between different pairs of adjacent turns 14a, 14b, 14c and 14d of the nut thread are identified by the designations $P_a$, $P_b$ and $P_c$ respectively. The pitch $P_a$ between the two upper turns is slightly greater than the pitch P of the external thread of the screw. The pitch $P_b$ between the next lower pair of turns of the nut thread is slightly greater than pitch $P_a$ between the upper turns, and the pitch $P_c$ between the lowest pair of turns is still greater than $P_b$.

In this specification, the term 'effective pitch' will be utilized to identify a pitch related characteristic of the nut thread at a particular point along its helical extent. The term is defined as the axial pitch distance which would occur between the point in question and a corresponding portion of the next turn of the nut thread if the lead angle (helix angle) of the thread did not change and were to remain the same as at the specified point. Thus, the 'effective pitch' at the upper extremity 27 of the nut thread (FIG. 2) is the pitch which the thread would have if its lead angle did not change and remained exactly the same as the lead angle A at the location 27 for at least one turn.

The 'effective pitch' of the nut thread at its upper extremity 27 is preferably exactly equal to the pitch P of the external thread of the coacting screw. Stated differently, the lead angle A of the nut thread at its upper extremity 27 is preferably equal to the uniform lead angle of the thread 13 of the mating screw. The rate of increase of the effective pitch of the internal thread of the nut should be uniform from the upper extremity 27 of the thread to its lower extremity 28. Thus, the pitch distance between corresponding portions of two successive turns of thread 14 preferably increases exactly the same amount for each degree of advancement of the nut thread about axis 18 at all points along the helical extent of the thread. As a result, the axial distance $P_c$ in FIG. 3 exceeds the distance $P_b$ by the same amount that $P_b$ exceeds $P_a$. The lead angle of the thread increases progressively from the minimum lead angle A at the upper end of the nut thread to a maximum lead angle B at the lower end 28 of the nut thread, with the rate of change of the lead angle being just sufficient to give the desired uniform rate of increase in the effective pitch of the nut thread from top to bottom as discussed To attain this result, the tangent of the lead angle rather than the lead angle itself preferably increases exactly the same amount for each degree of advancement of the thread about axis 18 at all points along the helical extent of the thread. Stated differently, the tangent of the lead angle increases at a uniform rate along the entire helical extent of the nut thread.

The screw 11 and nut 15 are preferably predesigned for use at a predetermined total axial load or tensional force F, which may be a very high force typically equal to about 80 percent of the ultimate tensile strength of the screw in order to attain an effective fatigue resisting characteristic in the made-up connection. The rate at which the pitch of the nut thread increases as it advances downwardly in FIG. 3 (when detached from the screw) may be predetermined to more uniformly distribute and preferably precisely equalize the load applied to the different turns of the nut thread at the fully loaded prestressed condition for which the parts are designed As the nut is first advanced threadedly onto screw 11, and before the lower transverse surface 29 of the nut contacts the surface of upper workpiece 16, there is an inherent interfering or binding action between the screw and nut threads giving a self locking action as represented in FIG. 4. In that condition, the turn 14a of the nut thread applies an upward force to the engaged turn 13a of the thread of the screw as represented at 30, and by reason of the progressive increase in the pitch of the nut thread as it advances downwardly the other turns 14b, 14c, and 14d of the nut thread apply downward rather than upward force to the engaged turns of the screw thread, as represented at 31, 32 and 33. This self locking action thus resists rotation of the nut relative to the screw to retain it frictionally in any set position relative to the screw until the work is contacted.

Figure 5:
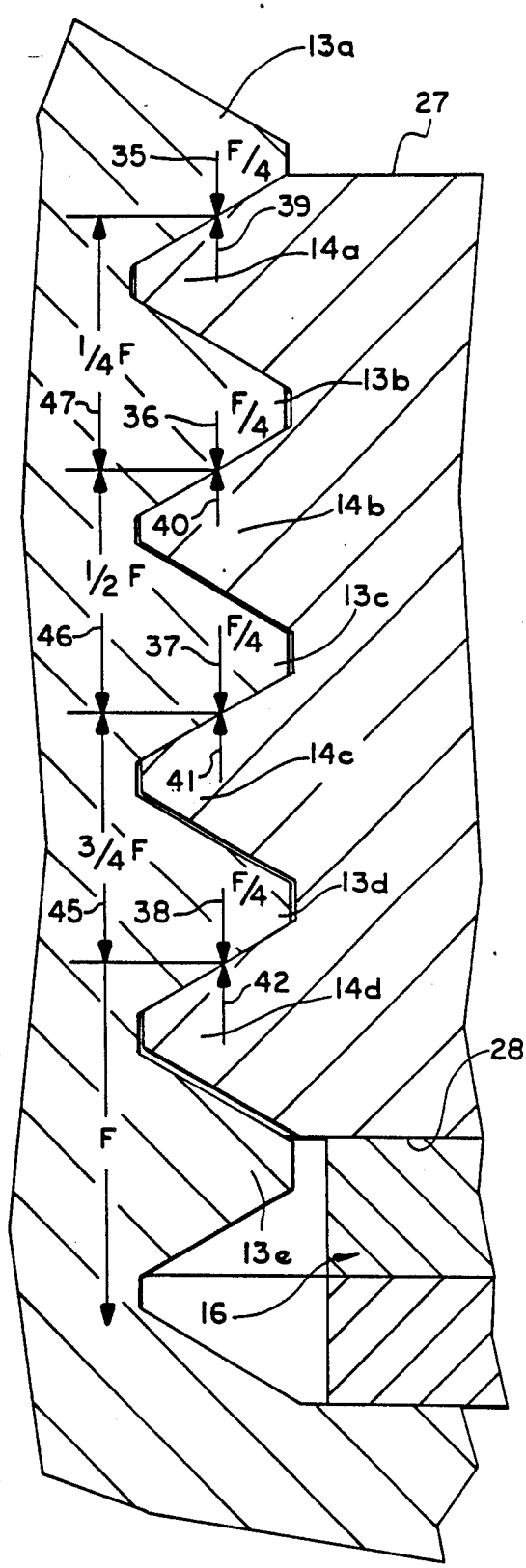
FIG. 5 shows the screw and nut after being tightened against the work to a highly prestressed condition.

When the nut has moved into engagement with the upper surface of the top plate 16, and the nut has been tightened to a predetermined torque raising the tensile force in the lower portion of the shank of the screw (beneath the level of the nut) to the desired highly prestressed value F, the threaded parts ultimately reach the condition represented in FIG. 5. In approaching that condition, and as the threaded connection is tightened, the shank 12 of the screw is gradually stretched to a slightly lengthened condition, moving slightly downwardly each of its turns beneath the one which contacts the upper turn 14a of the nut thread. At the same time, the downward force on the nut compresses the nut slightly to a somewhat reduced axial length, thereby moving the various turns of the nut thread slightly closely together This stretching of the screw and compression of the nut moves turns 13b, 13c, 13d and 13e of the thread of the screw downwardly relative to the engaged turns of the nut thread, until the turns 13b, 13c and 13d ultimately contact and bear downwardly against turns 14b, 14c and 14d of the nut thread, so that the screw then applies force downwardly to all turns of the nut thread at 35, 36, 37 and 38. The nut thread of course exerts a corresponding upward force against the screw at 39, 40, 41 and 42. When the connection has reached the prestressed condition in which the force in the lower portion of the screw shank is at the predetermined preload value F, the upward force exerted by each turn of the nut thread, at the location 39, 40, 41 or 42, is preferably exactly equal to the upward force exerted by each of the other turns at the others of these locations, and that condition exists at all points about the entire circular extent of the nut and throughout the entire helical extent of the nut thread, so that at every location from the upper extremity 27 of the nut thread to its lower extremity 28 the upward force applied by the nut thread to the thread of the screw is exactly the same.

Referring further to FIG. 5, it is noted that the full tensile force F which is applied to the lower portion of the shank of the screw beneath the level of the nut is not applied at that same value to all portions of the screw shank above that level If it is assumed as stated above that the total axial load force F is distributed equally between the different turns of the nut thread, and if there are exactly four turns of that thread, then a force equal to F/4 is applied downwardly at each turn as represented by the arrows 35, 36, 37 and 38. Since the lower turn 14d of the nut thread takes ¼th of the total axial load F, the tensile force applied to the screw just above that location, between the levels of turns 14d and 14c of the nut thread, is slightly reduced, to a value equal to ¾F, as represented at 45. Similarly, since the upper load, the tensile force applied to the screw above the level of the turn 14c and between the levels of turns 14c and 14b is reduced still further to a value equal to ½F, as represented at 46. In the same manner, the tensile force between turns 14b and 14a is ¼F as represented at 47. Because of these differences in tensile force applied to the different portions of the screw, and assuming that the screw is formed of steel or another material whose elongation is proportional to the tensional stress applied, the portion of the screw between turns 14b and 14c will stretch twice as much as the portion between turns 14a and 14b, and the portion of the screw between turns 14c and 14d will stretch three times as much as that between turns 14a and 14b. Similarly, the compressive forces applied to the nut between the different turns of the nut thread have the same ¼F, ½F and ¾F values as the corresponding tensional forces applied to the screw at the same levels. Consequently, the nut will compress twice as much between the levels of turns 14b and 14c as between turns 14a and 14b, and three times as much between turns 14c and 14d, as between turns 14a and 14b. The uniform rate of increase of the effective pitch of the thread of the nut (in its normal condition before connection to the screw) is just sufficient to allow for the discussed non-uniform stretching of the screw and non-uniform compression of the nut, so that after the screw has stretched and the nut has compressed under the predetermined total axial load force for which the connection is designed, the various load bearing thread faces will be precisely positioned under that load to attain the desired uniform distribution of the load along the entire helical extent of those faces In some cases, it is contemplated that the increase in 'effective' pitch of the nut thread between its upper end 27 and its lower end 28, in the FIG. 3 condition of the nut before connection to the screw, may typically be between about 3% and 20% of the effective pitch at the minimum pitch location 27, The optimum rate of increase of the pitch of the thread 14 of the nut (in its FIG. 3 condition before connection to the screw), can be defined in either of two different ways. More particularly this optimum rate of increase of the pitch of the nut thread can be defined in terms of the initial FIG. 3 pitch of the screw before connection to the nut, (which pitch as stated previously preferably corresponds to the "effective pitch" of the nut thread at its upper end) and the elongation and compression characteristics of the metal or metals or other materials of which the screw and nut are formed, or alternatively it can be defined in terms of the initial lead angle (helix angle) of the thread of the screw before connection to the nut (corresponding to the lead angle A of the nut thread at the upper end of the nut) in conjunction with the elongation and compression characteristics of the materials of which the screw and nut are formed. Utilizing the first of these methods of definition, it appears that the thread of the nut should in many applications of the invention preferably have a maximum 'effective pitch' $P_{max}$ at its lower extremity 28 (in its FIG. 3 condition before connection to the screw) defined by the formula:

$$P_{max} = P_{min} + P_{min} \cdot E + P_{min} \cdot C \quad (1)$$

where:
  $P_{min}$ is the minimum 'effective pitch' of the nut thread at its upper extremity 27 (before connection to the screw), and therefore the pitch of the thread of the screw (before connection to the nut)
  E is the percent elongation of the shank of the screw if subjected to a tensile force equal to the ultimate total axial load F between the screw and nut in the FIG. 1 condition to which the connection formed by the interconnected screw and nut is to be stressed.
  C is the percent compression of the nut under a compressive force equal to the total axial load between the screw and nut in their fully stressed condition.

To define these terms somewhat more specifically, E is the increase in the axial length of the shank 12 of the screw divided by its initial length when the shank is gripped in two chucks and a tensile force is exerted on the shank equal to the full predetermined preload force F to which the screw and nut are to be tightened, but with this measurement being taken while the screw is not engaged with the nut. Similarly, C is the decrease in the axial length of the nut divided by its initial axial length when the nut is pressed between two platens to a compressive force equalling the total axial load to which the connection is to be subjected, with the measurement being taken while the nut is not engaged with the screw.

If it is preferred that the pitch characteristics of the nut thread be defined in terms of lead angle rather than 'effective pitch', it currently appears that the optimum value for the maximum lead angle B at the lower end of the nut thread should in most instances satisfy the following formula:

$$TAN\ B = TAN\ A\ (1 + E + C) \quad (2)$$

where E and C have the same significance as set forth above.

In deriving formula (1) above, it is assumed that, in the fully tightened condition of the connection, there is no tensional force applied to the screw and no compressive force applied to the nut at the upper extremity 27 of the nut thread, and that at the lower extremity 28 of the nut thread the full axial load F is applied to the screw as a tensional force and to the nut as a compressive force. The formula gives the 'effective pitch' of the nut thread at the location 28 ($P_{max}$) in terms of the effective pitch $P_{min}$ at the location 27 (when the nut and screw are detached from one another as in FIG. 3). The formula indicates that $P_{max}$ must exceed $P_{min}$ by the sum of $P_{min} \cdot E$ and $P_{min} \cdot C$. The first of these terms $P_{min} \cdot E$ represents the amount that a portion of the screw having an axial length equal to the pitch P of the screw will stretch under the force F, and the term $P_{min} \cdot C$ represents the amount that a portion of the nut having the same axial length P will compress under the force F. These terms are additive, in that the effective pitch $P_{max}$ of the nut thread at point 28 must be increased to compensate for both the stretching of the screw and the compression of the nut.

If the increase in the effective pitch of the nut thread, and the corresponding increase in the tangent of the lead angle of the nut thread (in the FIG. 2 unstressed condition of the nut) are uniform along the entire length of the nut thread from its upper end to its lower end, it appears that the effective pitch $P_x$ and the lead angle X (FIG. 3) at any point between those opposite ends should in most cases satisfy the equation:

$$P_x = (P_{min} + P_{min} \cdot E + P_{min} \cdot C)\ y/z \quad (3)$$

$$TAN\ X = TAN\ A\ (1 + E + C) \cdot y/z \quad (4)$$

where:
  y is the axial distance between the upper end of the nut thread and the point at which the pitch $P_x$ and lead angle X are being determined.
  z is the total axial length of the nut thread between its upper and lower ends,
  and where the other symbols have the significance discussed above.
  The invention in its broadest aspects does not lie in these specific equations, but rather lies in the broad parameters set forth in the earlier part of this disclosure.

Figure 6:
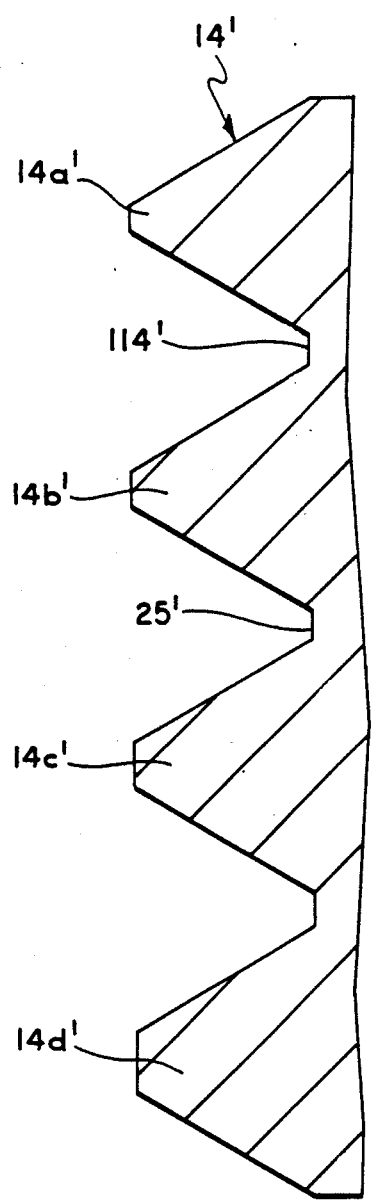
FIG. 6 is a view similar to the right hand portion of FIG. 3, but showing a variational form of nut embodying the invention.

FIG. 6 is a view similar to the right hand portion of FIG. 3, but showing a variational arrangement in which, though the increase in pitch of the thread 14' of the nut (corresponding to thread 14 of the first form of the invention) may be at a rate corresponding exactly to the rate of increase of the pitch in the first form of the invention, that change in pitch is attained by gradually increasing the axial thickness of the thread profile rather than by increasing the axial dimension of the groove 114' between successive turns of the thread. In FIG. 6, groove 114' and its root surface 25' may be of uniform and unchanging axial sectional configuration and axial dimension at all points along their helical length. That is, the groove as viewed in axial section in FIG. 6 has the same size and shape between the two lower turns 14c' and 14d' as between turns 14b' and 14c', and between turns 14a' and 14b'. The turns themselves as viewed in axial section, do not have the same size as one another as viewed in FIG. 6, or as viewed in any other axial sectional plane. Rather, the lower turn 14d' has an axial thickness slightly thicker than the next turn 14b' which is slightly thicker than the next turn 14a'. This reduction in axial thickness is uniform from the lower extremity of the thread to its upper extremity and along the entire helical extent of the thread. The nut of FIG. 6 may be utilized with the same screw 11 as has been described in discussing the FIGS. 1 to 5 form of the invention. In FIG. 6, the nut thread at its upper extremity may have the same width axially as the groove 114' between successive turns of the nut thread, and consequently may be an exact fit within the mating inter-thread groove 113 of the screw, with the thread as it advances downwardly being slightly thicker axially than the groove in the nut and the groove in the screw to fit tightly therein.

As in the first form of the invention, the 'effective pitch' and the lead angle at the upper extremity of the thread 14' (corresponding to the point 27 of FIG. 2, and in the condition in which the nut is detached from the screw) are desirably the same as the preferably uniform effective pitch and lead angle of the thread of the coacting screw. The pitch and lead angle at the lower end of the nut thread (corresponding to point 28 of FIG. 2) are desirably the same as set forth in connection with the first form of the invention, and the rate of change of the pitch and lead angle between the upper and lower ends is also the same as in the first form of the invention, with the change in thickness of the nut thread itself being just sufficient to attain this desired progressive increase in pitch and lead angle.

Figure 7:
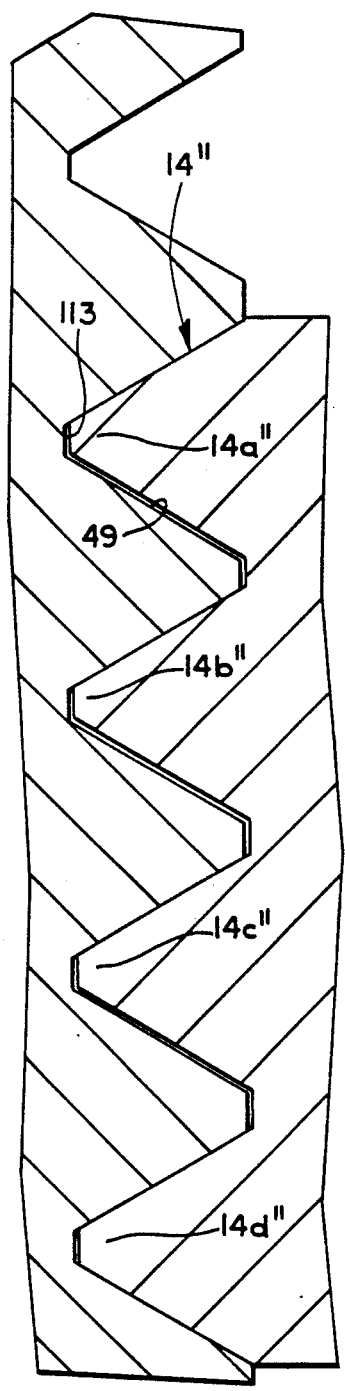
FIG. 7 shows the nut of FIG. 6 after having been screwed onto a coacting screw but before contacting the work.
Figure 8:
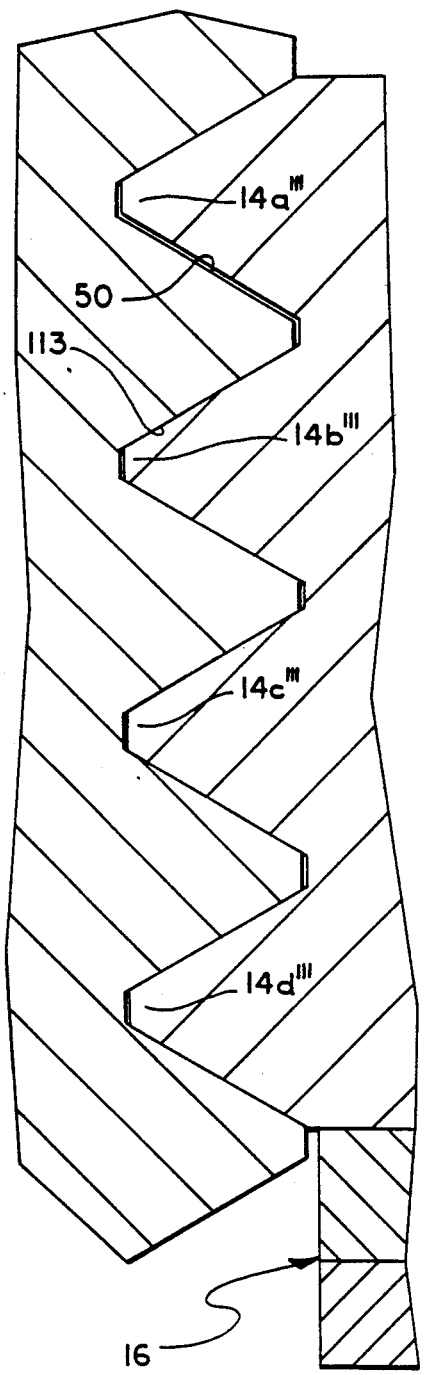
FIG. 8 is a view similar to FIG. 7 including a further variational type of nut.

The pitch and lead angle formulas set forth above apply to the FIG. 6 form of the invention in the same manner as in FIGS. 1 to 5. Also, the functioning of the nut of FIG. 6 is basically the same as in FIGS. 1 to 5 except that in FIG. 6 there is an additional slight binding action between the screw and nut caused by the fact that, as mentioned above, the axial thickness of the nut thread near the lower end of the nut is slightly greater than the axial dimension of the mating groove 113 between successive turns of the coacting screw. This relationship gives an increased interfering self locking action to all but the uppermost turns of the nut and thread connection. If desired, this binding effect can be partially or wholly avoided by forming the nut thread as shown in FIG. 7 at 14", so that its lower turn 14d''' rather than its upper turn 14a'' corresponds in axial dimension to the width of the inter-thread groove of the nut and is an exact fit within the groove 113 of the thread screw, with the axial thickness of the thread of the nut decreasing progresssively and uniformly as it advances upwardly to have some increasing clearance at 49 within the groove. Alternatively, the intermediate relationship of FIG. 8 may be employed, in which an intermediate turn 14b''' of the nut thread between its upper and lower ends corresponds in axial width to the inter-thread groove of the nut and is an exact fit within thread groove 113 of the screw while the turns beneath that precisely fitting turn slightly increase in axial thickness as they advance downwardly to have a slight binding action with the screw thread, and the turn or turns above turn 14b''' gradually decrease in axial thickness to have some looseness at 50. Thus, the amount of interference and self locking action can be adjusted to any desired value. In FIGS. 7 and 8, as in FIG. 6 it is assumed that the screw utilized with the nut is the same as the screw 11 of FIGS. 1 to 5.

FIG. 9 illustrates fragmentarily a variational type of thread profile, in which threads 43 and 44 of a screw and nut have root and crest surfaces 143 and 144 which are curved or rounded in axial section rather than flat. This rounded thread profile may be utilized in any of the various forms of the invention shown in FIGS. 1 through 8, or in the later-to-be-discussed arrangements of FIGS. 13 through 15. It will also be understood that threads having other axial sectional profiles may be employed in conections embodying the invention if desired.

FIGS. 10 and 11 illustrate diagrammatically one method and apparatus for forming a nut of the type illustrated in FIGS. 1 to 5. In that method, a nut body 49 containing an axial bore 50 is clamped within a chuck 51 of a lathe, screw machine or other machine tool 52 having a tool holder 53 carrying an internal tapping tool 54. The chuck and tool holder are rotated about an axis 55 relative to one another, and simultaneously advanced axially relative to one another, by a drive mechanism diagrammatically represented at 56, and at a rate causing the cutting tool to form an internal thread in the nut body. The drive mechanism 56 is programmed to advance the chuck and cutting tool axially relative to one another at a rate which increases slightly and uniformly in a manner giving the internal thread in the nut body the slightly increasing pitch discussed above.

If the thread to be formed is to have the uniform profile illustrated in FIG. 3, with the inter-thread groove progressively increasing in width, the cutting tool 54 may have three cutting edges 57, 58 and 59 shaped in correspondence with the axial profile configuration of a single turn of thread 14 of the nut of FIGS. 1 to 5 and adapted to simultaneously form surfaces 60, 61 and 62 respectively of the thread, so that as the tapping tool and nut body rotate and advance axially relative to one another, typically with the tapping tool moving leftwardly relative to the nut body as viewed in FIG. 10, the tapping tool forms the internal thread 14 in the nut body of uniform axial cross-section along the entire helical length of the thread. A fourth cutting edge may be provided at 57' for making an initial cut one turn in advance of edge 57 and on the same side of the thread as edge 57. Because of the progressive increase in the rate of axial advancement of the cutter, the edge 57 will on each turn cut slightly more deeply (farther to the left) than did edge 57' on the preceding turn.

If the thread to be formed is of the type shown in FIG. 6, a cutting tool of the type illustrated at 63 in FIG. 12 may be substituted for the cutter 54 of FIGS. 10 and 11, with the tool being shaped in correspondence with the inter-thread groove 114' in FIG. 6 to give that groove a uniform axial sectional configuration along its length while leaving a thread shaped land 114'' of increasing axial thickness between successive turns of the groove. It will of course also be understood that, in both of the methods illustrated in FIGS. 10 through 12, other known types of thread forming tools may in some instances be utilized in lieu of the cutters 54 and 63, such as for example an appropriate grinding tool or other element capable of making a cut or cuts on a fastener body to produce the desired thread.

FIG. 13, shows another way that a nut similar to that of FIGS. 1 to 5 can be formed, by producing a thread element 64 separately from the body 65 of the nut, with the nut body containing a cylindrical bore 66 and with the element 64 being formed as a coil of metal wound helically as shown and shaped at its radially inner side to the configuration of a standard 60 degree thread The metal coil is rolled to the proper cross-section, and in a manner causing the coiled element to progressively increase in axial thickness as it advances helically downwardly in FIG. 13 to thus space successive turns of the thread apart a gradually and uniformly increasing pitch distance corresponding to that discussed in connection with FIGS. 1 through 5, and to achieve an ultimate overall configuration exactly the same as in FIGS. 1 to 5. The outer cylindrical surface 67 of the coiled element 64 may be rigidly secured to the inner surface of the nut body, as by welding at 68, typically by laser or electron beam welding techniques A nut such as that shown in FIG. 6, FIG. 7, FIG. 8 or FIG. 9 can of course also be formed by this method, with the coiled thread element being appropriately rolled to a cross-section giving the same internal thread shape as illustrated in the desired one of these Figures.

Figure 14:
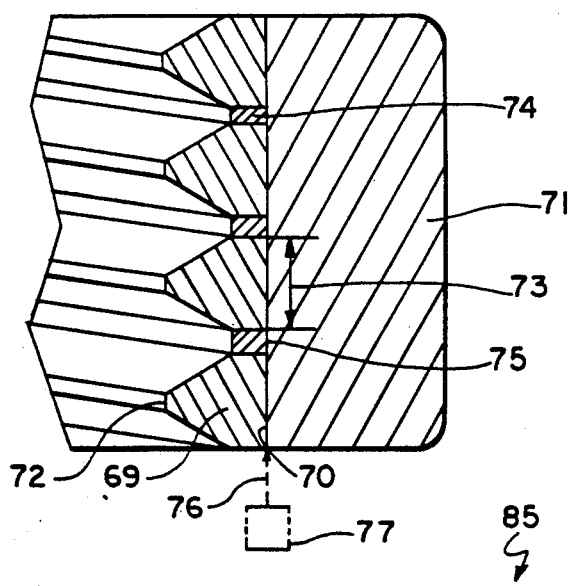

FIG. 14 shows another variational arrangement similar to that of FIG. 13, having a helically colied element 69 contained within a cylindrical bore 70 in a nut body 71, with the coiled element 69 having a cross-section defining a thread 72 at its radially inner side. The thread element 69 in FIG. 14 has an axial thickness 73 which is uniform along the entire helical extent of the thread element, and does not increase progressively in thickness as in FIG. 13. The gradual increase in pitch of the thread of FIG. 14 is attained by provision of a helically coiled spacer or shim element 74, which may be formed of the same metal as thread element 69 and is received axially between successive turns of the thread element along its entire helical extent. Spacer 74 increases gradually in axial thickness, at a uniform rate, as it advances helically and downwardly in FIG. 14, to thereby give the thread 72 the same uniform progressive increase in pitch as in FIGS. 1 to 5 and as in the other forms of the invention. The thread element 69 and spacer 74 have their radially outer surfaces 75 continuously welded or otherwise rigidly secured to the inner bore 70 of nut body 71, as by direction of a laser welding beam 76 from a laser 77 axially along the inner bore 70 of body 71 and the engaged outer surfaces of elements 69 and 75 while rotating the nut body and elements 69 and 75 about the axis of the nut relative to the laser (or vice versa) This same type of welding process may be employed in forming the FIG. 13 nut.

Figure 15:
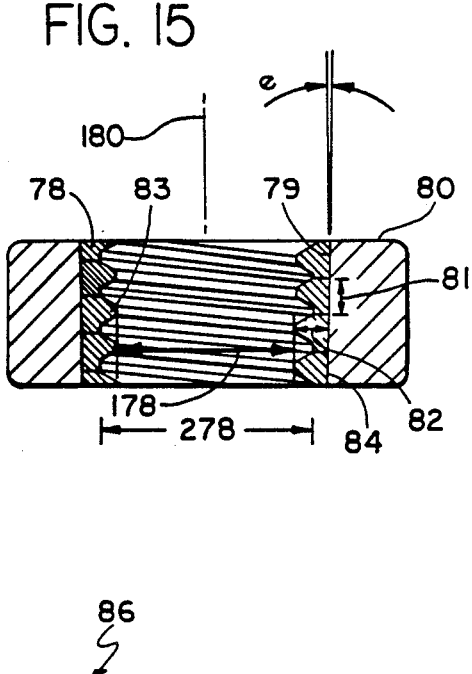

FIG. 15 shows another arrangement which is similar to those of FIGS. 13 and 14, and which includes a helically coiled thread element 78 contained within a passage 79 in a nut body 80. In FIG. 15, the axial thickness 81 of the helically coiled thread element 78 increases progressively and at a uniform rate as the thread element advances helically and downwardly in FIG. 15, and as discussed in connection with FIG. 13. In order to allow the cross-sectional area of the helically coiled element as viewed in axial section to remain the same even though the axial thickness 81 of the thread element gradually increases, the radial thickness 82 of the thread element gradually decreases as the element 78 advances helically and downwardly in FIG. 15. To enable the minor diameter 178 and major diameter 278 of the inner thread profile 83 of the FIG. 15 coiled element 78 to remain uniform along the entire axial extent of the nut, the bore 79 of nut body 80 in FIG. 15 tapers gradually and progressively as it advances downwardly, at a very slight angle e with respect to the axis 180 of the nut body, and the outer surface 84 of the coiled thread element 78 is shaped to have a corresponding slight taper to continuously engage the inner wall surface of passage 79. The taper of surfaces 79 and 84 is just great enough to allow the axial cross-sectional area of thread element 78 to remain the same from the top of the nut body to the lower end of the nut body, so that the rolling apparatus or other equipment which forms coiled element 78 is not required to produce a coiled element of changing cross-section. All of the discussed parameters are of course predetermined to give the inner thread 83 formed by the composite nut of FIG. 15 the same gradually and uniformly increasing pitch discussed in connection with the other forms of the invention.

Figure 16:
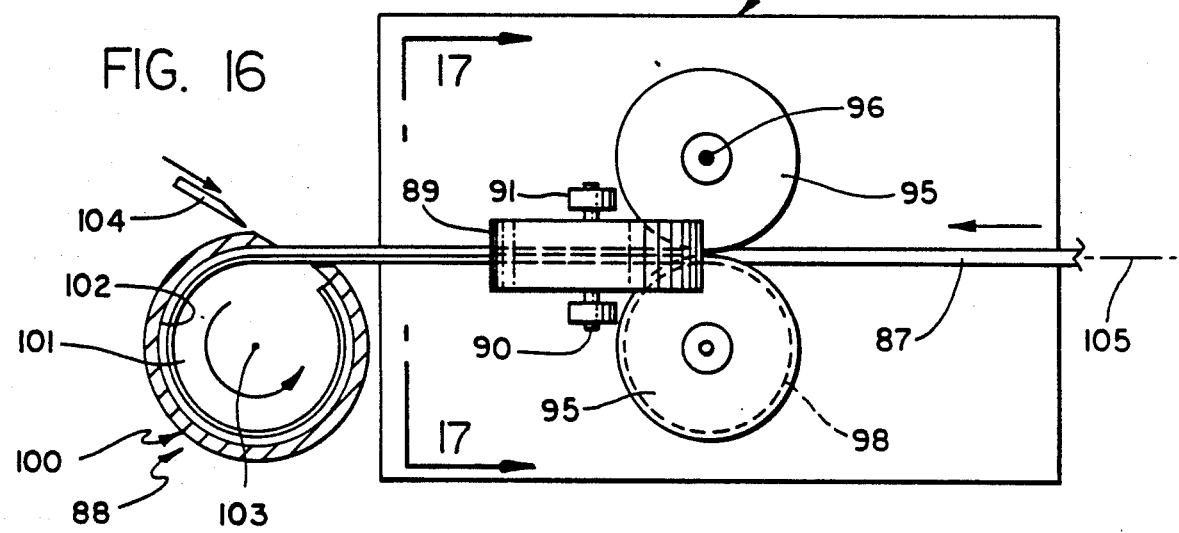
FIG. 16 represents diagrammatically a type of apparatus which may be used for forming the nuts of FIGS. 13 to 15.
Figure 17:
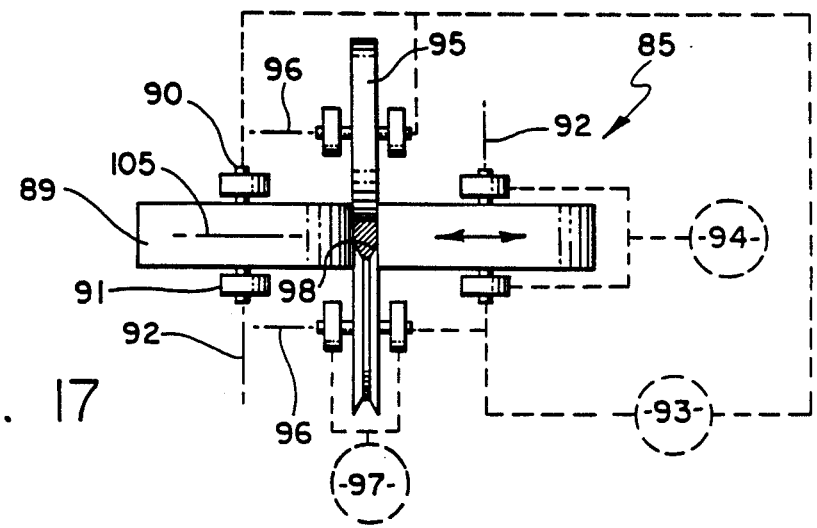
FIG. 17 is a similarly diagrammatic view taken on line 17—17 of FIG. 16.

FIGS. 16 and 17 illustrate diagramatically a type of apparatus 85 which may be employed for forming the coiled elements 64, 69, 74 and 78 of FIGS. 13 through 15. This apparatus 85 may include a rolling or extruding unit 86 which receives an elongated strip 87 of stainless steel or other metal to be shaped as the coiled thread element, and a coiling unit represented at 88. The rolling mechanism 86 may include two or more sets of rollers for engaging different sides of the strip of metal 87 and applying pressure thereto in a manner producing the transverse cross-sectional shape required for any of the forms of the invention shown in FIGS. 13 through 15 . For example, the apparatus 86 may include a first pair of rollers 89 having shafts 90 appropriately journalled by bearings 91 to mount the rollers for rotation about spaced axes 92, with the rollers being driven about those axes by a drive mechanism 93. The bearings 90 associated with one of the rollers are adapted to be actuated toward and away from the other roller by a computer controlled mechanism represented at 94, to vary the spacing between the rollers and thus allow the thickness of strip 87 in one direction to be controlled by mechanism 94. A second pair of rollers 95 may be very similar to rollers 89 and be driven about individual axes 96 by drive mechanism 93, with the rollers 95 being turned 90 degrees about the longitudinal axis 105 of the mechanism with respect to rollers 89 to engage and to form two different sides of the strip 87. An automatically controlled mechanism 97 similar to mechanism 94 may actuate one of the rollers 95 toward and away from the other to vary the thickness of the formed coiled element in that direction. Also, one of the rollers 95 may have a recess or annular groove 98 shaped to define the inner thread profile of the coiled element, while the opposed roller 95 may have a tapered shape to form the tapered surface 84 on the coiled element of FIG. 15. For the other two forms of the invention shown in FIGS. 13 and 14, the roller faces are of course shaped as required to give the illustrated cross-sectional configuration of the coiled element. The mechanisms 94 and 97 are actuated in timed relation to the rotation of rollers 89 and 95 by drive 93 and thus to the rate of longitudinal advancement of strip 87 by those rollers, and are controlled to vary the axial and radial thicknesses 81 and 82 of FIG. 15 in the relation previously discussed. Similarly, the mechanism 94 is controlled to vary the axial thickness of the coiled element in producing the FIG. 13 nut. While only two sets of rollers are illustrated, the apparatus may include several sets of rollers engaging the strip 87 at different locations and gradually deforming the strip to the desired ultimate cross-section.

After the cross-sectional shape of the elongated element 87 has been defined accurately by passage through as many sets of rollers as are necessary in the apparatus 86 of FIG. 16, the properly shaped coiled element is advanced leftwardly in FIG. 16 by the rollers and to the coiling mechanism 88, which is typically illustrated as comprising a rigid hollow member 100 containing a recess 101 having a side wall surface 102 against which the elongated element 87 is directed and which is shaped to require that element to coil itself helically about an axis 103. After an appropriate number of turns of the element 87 have been coiled within member 100, a cutter represented diagrammatically at 104 may cut off the element 87 so that the coiled device may then be inserted in a nut body and welded therein as discussed. If the nut being formed is of the type illustrated in FIG. 13 or FIG. 14, the wall 102 against which the element is coiled may be cylindrical about axis 103. If the arrangement of FIG. 15 is being formed, the wall 102 may have a taper corresponding to that of tapered inner surface 79 of the nut body 80 of FIG. 15, so that the coiled element will fit properly in that body. In each of the arrangements of FIGS. 13, 14 and 15, the coiled element or elements may be welded in place within the nut body by a laser welding system as illustrated at 77 in FIG. 14, or by any other convenient means. It will of course also be understood that other types of thread forming equipment can be utilized in lieu of the rolling apparatus 86 and coiling apparatus 88 diagrammatically represented in FIGS. 16 and 17.

While certain specific embodiments of the present invention have been disclosed as typical, the invention is of course not limited to these particular forms, but rather is applicable broadly to all such variations as fall within the scope of the appended claims.

I claim:

1. The method of forming a composite nut that comprises:
    progressively deforming an elongated element having a predetermined initial cross section to the form of a coil defining an internal thread and having a progressively changing cross section giving the thread a progressively changing pitch; and
    securing said coil rigidly within a passage in a nut body with the thread at said changing pitch;
    said deforming of the element including shaping said element to have axial and radial dimensions one of which progressively increases in a predetermined direction, and the other of which progressively decreases in said direction at a rate compensating for the increase in said one dimension and giving the element a substantially uniform cross sectional area along its length.

2. The method of forming a composite nut that comprises: positioning within a passage in a nut body an elongated helically coiled element having a cross section defining an internal thread;
    attaching said coiled element rigidly to said body; and
    interposing between successive turns of said coiled element spacer means of progressively increasing axial dimension maintaining said thread at a progressively and gradually increasing pitch.

3. The method as recited in claim 2, in which said spacer means comprise an elongated coiled spacer of progressively increasing axial thickness received between successive turns of said coiled element.

4. The method of forming a composite nut that comprises:
    progressively deforming an elongated element having a predetermined initial cross section to the form of a coil defining an internal thread and having a progressively changing cross section giving the thread a progressively changing pitch;
    securing said coil rigidly within a passage in a nut body with the thread at said changing pitch;
    said deforming of the element including shaping said element so that as the coil advances in one axial direction said element progressively increases in axial dimension to attain said changing pitch and progressively decreases in radial dimension; and
    forming said passage in the body to progressively decrease in radial dimension as it advances in said axial direction and in correspondence with the progressive decrease in radial dimension of said element and in a relation maintaining said internal thread at a uniform diameter.

5. The method of forming a composite nut that comprises:
    progressively deforming an elongated element having a predetermined initial cross section to the form of a coil defining an internal thread and having a progressively changing cross section giving the thread a progressively changing pitch;
    said deforming of the element including shaping said element to have a radial thickness which decreases progressively as the coil advances in a predetermined direction, and to have an external diameter which decreases progressively as the coil advances in said direction and at a rate compensating for the change in radial thickness and thereby giving said thread a uniform diameter, and securing said coil within a passage in a nut body.

* * * * *